United States Patent [19]

Broadbent

[11] 3,709,552
[45] Jan. 9, 1973

[54] VAN BODIES
[75] Inventor: Edward Gerald Broadbent, Sandbach, England
[73] Assignee: Shellag Estates Limited, Douglas, Isle of Man, Great Britain
[22] Filed: Oct. 12, 1970
[21] Appl. No.: 80,098

[30] Foreign Application Priority Data
Oct. 10, 1969 Great Britain.....................49,786/69

[52] U.S. Cl.................296/28 M, 160/330, 296/155
[51] Int. Cl. ...............................................B60j 5/06
[58] Field of Search......296/28 M, 98, 100, 146, 155, 296/135, 138, 142; 105/378; 188/77 R; 160/84, 290, 264, 330, 349; 16/87, 90, 94

[56] References Cited

UNITED STATES PATENTS

| | | | |
|---|---|---|---|
| 3,453,020 | 7/1969 | Santillo | 296/100 |
| 759,628 | 5/1904 | Nicolai | 296/100 |
| 584,625 | 6/1897 | Cronin | 188/77 R X |
| 1,405,485 | 2/1922 | Callery | 105/378 |
| 1,938,635 | 12/1933 | North | 160/290 R X |
| 2,479,280 | 8/1949 | Tuerk | 296/100 |
| 1,307,440 | 6/1919 | Fitch | 160/349 |

FOREIGN PATENTS OR APPLICATIONS 853,280   11/1960   Great Britain.......................296/100

*Primary Examiner*—Benjamin Hersh
*Assistant Examiner*—L. Paperner
*Attorney*—Holman and Stern

[57] ABSTRACT

A van body with an open side closable by a sliding curtain suspended from the roof of the body. One vertical edge of the curtain is detachably secured to an end of the open side and the other vertical curtain edge is detachably connected with a rotary spool element at the opposite end of the open side onto which curtain is wound for horizontal tensioning. Spool locking means is provided to prevent slackening of the tensioned curtain. The curtain is also tensioned vertically by straps which connect between travelling elements by which the curtain is suspended and anchorages on the body.

16 Claims, 6 Drawing Figures

PATENTED JAN 9 1973 3,709,552
SHEET 1 OF 3
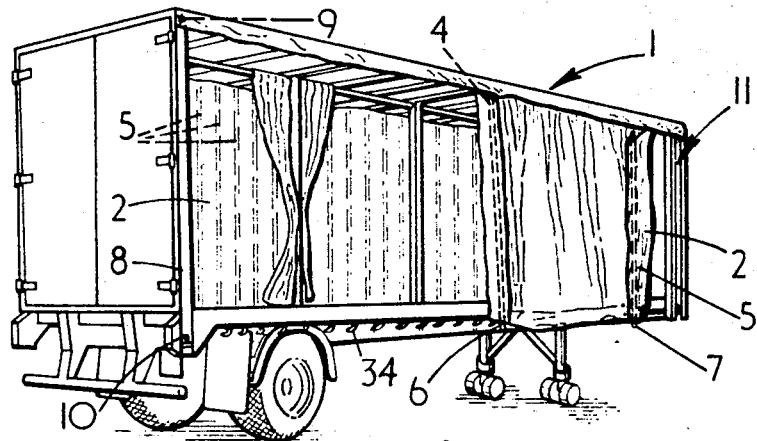
FIG. 1
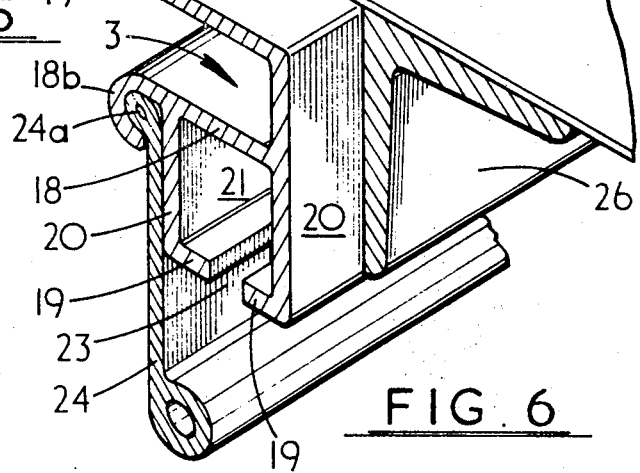
FIG. 5
FIG. 6

VAN BODIES

BACKGROUND OF THE INVENTION

This invention relates to van bodies and particularly to van bodies having one or more sides closable by sliding curtains.

FIELD OF THE INVENTION

The term "van body" is used herein to mean any body which has a bed for supporting cargo to be transported and a roof disposed above said bed and which is, or is intended, to be mounted on wheels to provide the trailer portion of an articulated road vehicle, the body portion of a non-articulated road vehicle, or even a railway freight wagon. The one or more sides referred to as being closable by sliding curtains may be the vertical, lateral or end sides of the body but will usually be the two parallel lateral sides thereof.

PRIOR ART

It is well known to provide curtain-sided van bodies for freight-transporting road vehicles but the previously proposed constructions have been disadvantageous in that adverse wind conditions or other factors could cause severe billowing of the curtain during travel leading to impeded rear vision through the side mirrors and possible tearing of the curtains. Lashing the curtains in position with ropes has not led to a complete solution of this problem and is in any case an inconvenient and time-consuming operation.

It is an object of the present invention to provide a curtain-sided body in which the above disadvantage is obviated or mitigated by the provision of simple and effective means for vertically and/or horizontally tensioning the curtains and a further object of the invention is the provision of an improved guide rail for carrying the curtains.

SUMMARY OF THE INVENTION

According to a first aspect of the present invention, there is provided a van body as hereinbefore defined having at least one open side thereof closable by a slidable curtain suspended from the roof of the body, co-operating means on said curtain and body for detachably securing one vertical edge of the curtain to the body along one vertical end of said side and, disposed at the other vertical end of said side, tensioning means adapted for detachable connection with the opposing vertical edge of the curtain and operable to exert a horizontal tensioning force on said curtain.

According to a second aspect of the present invention, there is provided a van body as hereinbefore defined having at least one side thereof closable by a curtain slidably suspended by travelling elements from a curtain rail mounted on the roof of the body, said curtain being associated with a plurality of horizontally spaced, vertically extending tensioning straps, lines or the like, each having an upper end fast with one of said elements and a lower end adapted to be secured to said body whereby when said straps, lines or the like are so secured and placed under tension, the curtain is restrained into the vertical plane.

According to a third aspect of the present invention, there is provided a guide rail for a slidable closure member comprising a track adapted to accommodate travelling means to which the closure member can be secured, means to one side of the track securing the track in a desired position and means to the other side of the track for attaching thereto a valance.

An embodiment of the invention will now be described by way of example only with reference to the accompanying drawings in which:

BRIEF DESCRIPTION OF THE DRAWINGS

FIG. 1 is a perspective view from the side and rear of the van body;

FIGS. 5 and 6 are perspective sectional views of alternative embodiments of curtain rail.

DETAILED DESCRIPTION OF THE INVENTION

Figure 3:
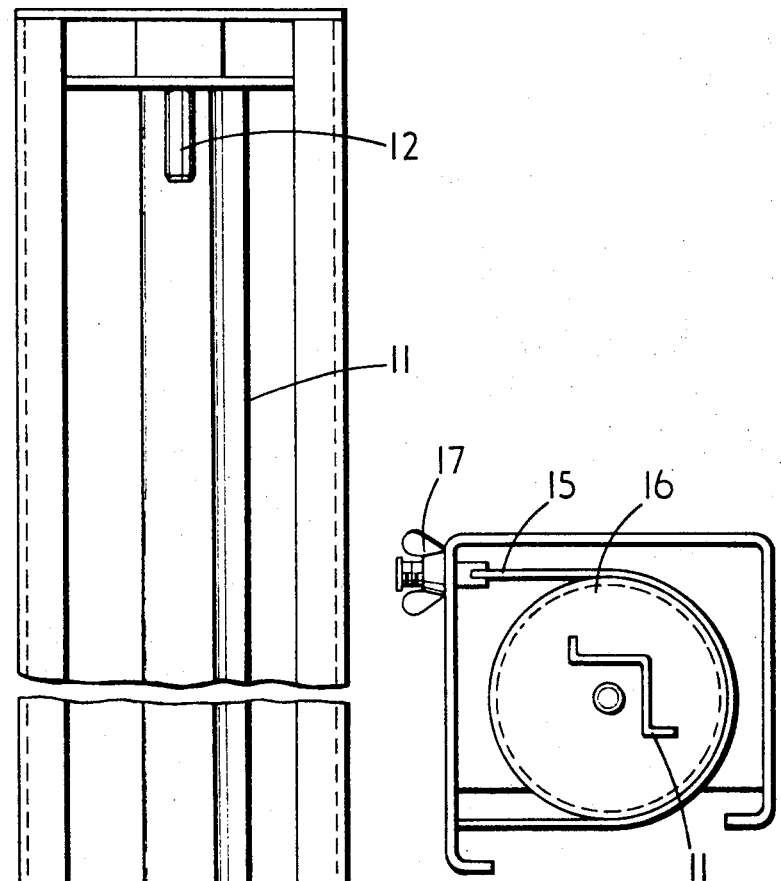
FIG. 3 is a plan view of the horizontal tensioning device.

Referring to the drawings, a van body 1 (FIG. 1) has two parallel longitudinal sides thereof closable by curtains 2 which travel on curtain rails 3 (FIGS. 4, 5 and 6) attached to the roof of the body 1. For the sake of simplicity, since the arrangements at the two sides correspond exactly, only one side will now be described in detail.

Figure 2:
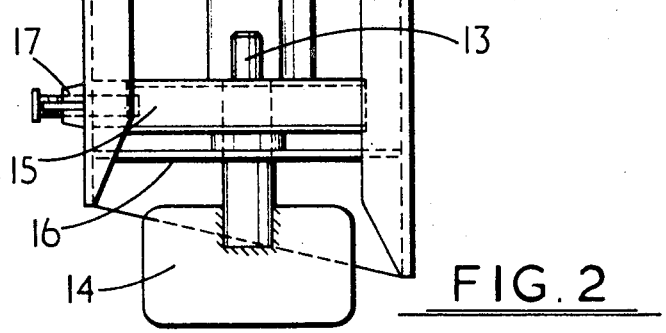
FIG. 2 is a side view of the horizontal tensioning device.

The curtain 2 is preferably made of nylon or terylene reinforced P.V.C. but may be made of any suitable material which is waterproof and has adequate folding properties. When closed, the curtain 2 is secured by its front and rear vertical edges, each of which is formed with a sleeve 4, 5, accommodating a hollow steel tube 6, 7. The rear tube 6 is detachably mounted on a rear corner post 8 of the body by upper and lower plugs or sleeves 9, 10, engageable in the open ends of the tube 6 so as to anchor the rear edge of the curtain 2 in position. The front tube 7 is accepted in the angle of a vertically disposed L-section spool element 11 (FIGS. 2 and 3) at the corresponding side of the front end of the van body 1 and detachably held therein by upper and lower plugs or sleeves 12, 13 engaging in the upper and lower ends of the tube 7. The spool element 11 is mounted for rotation about a vertical axis by means of a conveniently positioned handle 14 and may be locked against rotation by a suitable mechanism, e.g., a simple brake provided by a band 15 frictionally engaging a drum 16 and capable of being tightened thereon by a wing nut 17.

Horizontal tensioning of the curtain is effected by rotating the spool element 11 when the curtain 2 is closed until a sufficient tensional force has been exerted thereon and then locking the spool element against reverse rotation by means of the brake.

Figure 4:
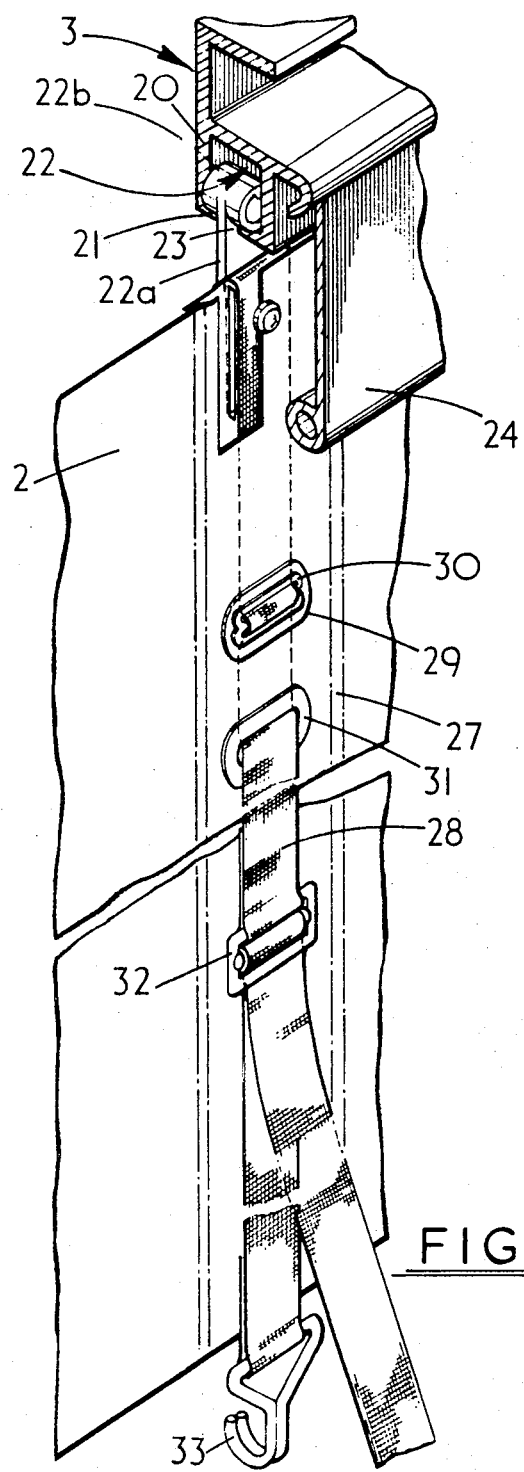
FIG. 4 is a part-sectional view illustrating the vertical tensioning means.

As shown in FIGS. 4, 5 and 6, the rail 3 from which the curtain 2 is suspended is made of extruded aluminum alloy and is of generally rectangular section having upper, lower and side walls (18, 19, 20) defining a track 21 accommodating travellers 22 (FIG. 4) to which the curtain 2 is secured at its upper edge. The lower wall 19 of the rail is formed with a longitudinal slot 23 through which attachment tongues 22a of the travellers 22 extend. The inner side wall 20 of the rail 3 is extended in the embodiment shown in FIG. 5 to form a vertical flange 20a which is bolted to a roof member (not shown) and a horizontal flange 20b projects at right angles from this side wall 20 slightly below the level of the upper wall 18 of the rail and is also bolted to said roof member thus fixing the rail 3 in a desired position. The upper wall 18 of the rail 3 is formed with a longitudinal depression 18a on its external surface. The depression 18a and the fact that the outer surface of the upper wall 18 is slightly proud of the exposed surface of the horizontal mounting flange 20b tend to inhibit water collected on the roof from spilling over the side of the roof and onto the curtain. A web 18b which may be regarded as an extension of the upper wall 18 of the rail 3, curves downwardly to overlie the outer side wall 20 of the rail 3 and define therewith a channel in which is received the upper edge of a valance (not shown) which overlaps the upper edge of the curtain 2 to prevent entry of rain water into the body 1 through the space between the curtain 2 and the rail 3. The valance is firmly secured in position simply by deforming said web 18b towards the side wall 20 so as to clamp the valance edge between the web and the wall.

In the embodiment of rail shown in FIG. 6, the web 18b defines with the outer side wall 20 a cylindrical channel which slidably receives a beaded upper edge 24a of a valance 24. The web 20b shown in FIG. 5 is replaced by an L-section web 18c which extends upwardly from the inner side wall 20 and over the upper wall 18 of the rail 3. The rail 3 is secured, as by bolts or rivets, onto roof members 25 and 26, which together define an angle in which the web 18c is received. This construction has the advantage that the van body is completely shielded against ingress of water between the rail and the roof members or between the rail and the curtain.

Each of the travellers 22 (FIG. 4) accommodated by the track 21 is made of nylon or other durable material having a low friction co-efficient and consists of a hollow cylindrical portion 22b lying with its axis transverse to the length of the track 21 for sliding movement therealong and the attachment portion or tongue 22a referred to above which extends through the slot 23 in the rail 3 and is attached to the curtain 2.

The attachment tongues 22a of the travellers 22 may engage in the upper ends of vertical sleeves 27 formed in the curtain 2 at regular intervals along its length. Each sleeve 27 accommodates a strong strap 28 of webbing secured to the tongue 22a and extending downwardly through the sleeve 27. The strap 28 passes through an upper eye 29 in the outer wall of the sleeve 27 near the lower end of the curtain 2 to engage a buckle 30 and then returns to the sleeve 27 through the same eye 29 before making its final exit through a lower eye 31. The lower section of the strap 28 which is thus exposed incorporates a quick release manual tensioning device 32 of known type and terminates in a coupling element 33 which is releasably attached to a hook 34 on the van body 1 below the curtained side (FIG. 1).

When the manual tensioning device 32 is operated, the strap 28 is tightened and exerts a downward pull on the curtain 2 through the buckle 30 at the upper sleeve eye 29, the buckle 30 having been previously adjusted relative to the strap 28 to ensure that the latter may be fully tensioned without straining the curtain material excessively. The main tensioning load is thus taken by the straps and not by the more fragile curtain. If appropriately spaced, the straps also serve the useful function of retaining in the body 1 a much heavier dislodged load than could be retained by the curtain material along.

What we claim is:

1. A van body comprising a bed for supporting cargo, a roof supported above the bed at at least two opposed vertical sides, at least one vertical open side for loading and unloading cargo, a guide rail along the roof at the open side, a plurality of travelling elements engaging the rail and movable therealong, a vertical curtain suspended from the travelling elements and movable therewith to close the open side, a rigid connector at each vertical edge of the curtain, securing means at each end of the open side to receive and hold the connectors, and tensioning means at an end of the open side coacting with the securing means to exert a horizontal tensioning force on the curtain.

2. The van body as claimed in claim 1, in which each connector is a hollow tube accommodated within a sleeve at each vertical edge of the curtain.

3. The van body as claimed in claim 2, in which each securing means is constituted by upper and lower plugs for engagement in the open ends of the hollow tubes.

4. The van body as claimed in claim 2, including a rotatable spool element engageable with one of the tubes to wind up the curtain and thus apply a horizontal tensioning force thereto.

5. The van body as claimed in claim 4 comprising locking means associated with the spool element to prevent reverse rotation thereof.

6. The van body as claimed in claim 5, in which the locking means comprises a drum fixed to the rotary spool element and an adjustable brake band frictionally engaging the drum.

7. The van body as claimed in claim 1, comprising a plurality of horizontally spaced, vertically extending tensioning straps having upper and lower ends, each having the upper end fast with one of said elements, means at the lower end of each strap for securement to said body and means for applying a tensioning force to each strap to restrain the curtain into the vertical plane.

8. The van body as claimed in claim 7, wherein each tensioning strap is accommodated in a vertical sleeve provided in the curtain.

9. The van body as claimed in claim 7, wherein each strap is provided adjacent its lower end with a quick release manual tensioning device.

10. The van body as claimed in claim 1, wherein the guide rail comprises a track, means to one side of the track securing the track in a desired position, and means to the other side of the track for attachment of a valance.

11. The van body as claimed in claim 10, wherein the means for attachment of the valance comprises a channel in which a beaded upper edge of the valance is slidably engageable.

12. The van body comprising a bed for supporting cargo, a roof supported above the bed at at least two opposed vertical sides, at least one vertical open side for loading and unloading cargo, a guide rail along the roof at the open side, a plurality of travelling elements engaging the rail and movable therealong, a vertical curtain suspended from the travelling elements and movable therewith to close the open side, a plurality of horizontally spaced, vertically extending tensioning straps having upper and lower ends, each having the upper end fast with one of said travelling elements, means at the lower end of each strap for securement to said body, and means for applying a tensioning force to each strap to restrain the curtain into the vertical plane.

13. The van body as claimed in claim 12, wherein the tensioning straps are each accommodated in a vertical sleeve provided in the curtain.

14. The van body as claimed in claim 12, wherein each strap is provided adjacent its lower end with a quick release manual tensioning device.

15. The van body as claimed in claim 12, wherein the guide rail comprises a track, means to one side of the track securing the track in a desired position, and means to the other side of the track for attachment of a valance.

16. The van body as claimed in claim 15, wherein the means for attachment of the valance comprises a channel in which a beaded upper edge of the valance is slidably engageable.

* * * * *